United States Patent
Erdman et al.

(10) Patent No.: US 8,625,315 B2
(45) Date of Patent: Jan. 7, 2014

(54) INVERTER MODULATOR WITH VARIABLE SWITCHING FREQUENCY

(75) Inventors: William L. Erdman, Moraga, CA (US); Jackson Moore, Oakland, CA (US)

(73) Assignee: ETM Electromatic Inc, Newark, CA (US)

(*) Notice: Subject to any disclaimer, the term of this patent is extended or adjusted under 35 U.S.C. 154(b) by 527 days.

(21) Appl. No.: 12/149,914

(22) Filed: May 9, 2008

(65) Prior Publication Data
US 2009/0279336 A1    Nov. 12, 2009

(51) Int. Cl.
*H02M 1/12*    (2006.01)
*H02M 7/521*    (2006.01)

(52) U.S. Cl.
USPC ............................................. 363/41; 363/98

(58) Field of Classification Search
USPC ............................ 363/39, 40, 41, 97, 98, 131
See application file for complete search history.

(56) References Cited

U.S. PATENT DOCUMENTS

| | | | | |
|---|---|---|---|---|
| 3,611,086 A | * | 10/1971 | Mokrytzki et al. | 363/37 |
| 4,333,136 A | * | 6/1982 | Baker | 363/43 |
| 4,375,662 A | * | 3/1983 | Baker | 363/95 |
| 5,068,777 A | * | 11/1991 | Ito | 363/97 |
| 5,677,833 A | * | 10/1997 | Bingley | 363/71 |
| 5,717,585 A | * | 2/1998 | Nguyen et al. | 363/98 |
| 6,058,031 A | * | 5/2000 | Lyons et al. | 363/67 |
| 6,771,522 B2 | * | 8/2004 | Hayashi et al. | 363/71 |
| 7,120,037 B2 | * | 10/2006 | Komatsu et al. | 363/37 |
| 7,126,294 B2 | * | 10/2006 | Minami et al. | 318/139 |
| 7,148,650 B1 | * | 12/2006 | McNulty et al. | 318/801 |
| 7,239,113 B2 | * | 7/2007 | Johnson | 322/58 |
| 7,248,946 B2 | * | 7/2007 | Bashaw et al. | 700/286 |
| 7,378,804 B2 | * | 5/2008 | Mitsuyasu et al. | 315/247 |
| 7,400,109 B2 | * | 7/2008 | Nomura et al. | 318/801 |
| 7,456,523 B2 | * | 11/2008 | Kobayashi | 307/82 |
| 7,558,094 B2 | * | 7/2009 | Inoshita et al. | 363/132 |
| 2007/0052382 A1 | * | 3/2007 | Nomura et al. | 318/439 |
| 2007/0175429 A1 | * | 8/2007 | Yanagida et al. | 123/179.14 |

* cited by examiner

*Primary Examiner* — Gary L Laxton
(74) *Attorney, Agent, or Firm* — Elizabeth Nevis, Esq.; Shalini Venkatesh

(57) ABSTRACT

An inverter control is used to control the output of a distributed power generating station, such as a photovoltaic (PV) solar power station, connected to a power grid. The power station is connected to an inverter output. Pulse width modulation is used to shape the output in order to maximize power output within power quality parameters and provides control of a switching frequency of the inverter responsive to a sensed parameter. The technique allows an increase in output efficiency and provides for adjustment of power output to meet power quality parameters to an extent required in order to connect to the power grid.

14 Claims, 7 Drawing Sheets

INVERTER MODULATOR WITH VARIABLE SWITCHING FREQUENCY

FIELD

This disclosure relates to the control of electric power, and more particularly to inverter power control for use in distributed generation applications connected to an electrical load or power grid. Connection to the electrical grid could be at utility distribution or transmission levels

BACKGROUND

Photovoltaic (PV) power generation is typically used in a "distributed generation" scheme, in which multiple PV power generators are connected to an electrical grid.

Photovoltaic (PV) power generation has made tremendous strides over the last 10 years in terms of delivered cost of energy. Despite this, the capital costs associated with PV modules and associated items such as inverters and mounting structures remain high and there is a need to reduce these costs further. Therefore, where the cost of energy is fairly high, the ability to capture a high percentage of energy is important. To help PV power generation become more cost competitive and therefore more widely accepted some government agencies, such as the California Energy Commission (CEC) and the federal government have established base financial incentives for this PV system generation (e.g., rebates or subsidies). The California Energy Commission, for example, bases its rebates on PV inverter efficiency. The efficiency used for rebate purposes is a weighted efficiency which seeks to incentivize high efficiencies at the percent of power rating that systems operate at for long periods of time. In other jurisdictions, the same weighted efficiency may be used, but the weighting is different and determined by local solar irradiance conditions. By way of example, the CEC heavily weights operation at 75% power, whereas in Europe 66% power is the more heavily weighted power level.

Within the PV inverter, there are loss mechanisms that are related to and are directly proportional to switching frequency which is determined by a carrier waveform used in pulse-width modulation (PWM) or other switching technique. For this reason, it is desirable to keep the switching frequency as low as possible; however, this must be traded off with the AC waveform distortion which is improved by going to high switching frequencies. Because of these two competing requirements, the selection of switching frequency has always been a compromise and it has traditionally been held constant for a given inverter design. The AC waveform distortion is typically determined by the harmonic content or total harmonic distortion (THD) of the AC waveform. In a perfectly ideal AC waveform, the THD is zero, meaning that there are no harmonic components present on top of the 50 Hz (Europe) or 60 Hz (North America) fundamental component. The standard which sets the maximum allowable THD in North America is IEEE 519. In Europe, there are International Electrotechnique Commission (IEC) standards that govern maximum allowable THD. These standards establish permissible THD limits, although THD limits can also be established from other sources, or can be arbitrarily set.

SUMMARY

An inverter control circuit used in distributed generation provides an ability to control power output in a manner consistent with THD requirements and attempts to maximize efficiency of the distributed generation energy source such as PV. A pulse width modulation (PWM) control circuit is used for controlling the inverter and the ability to vary the switching frequency as a function of power is a desirable feature. A circuit module controls the switching frequency of a PWM carrier wave provided by the inverter and varies the switching frequency responsive to a sensed DC power received from a power source. The PWM control circuit is adjusted responsive to an allowed waveform distortion and power delivery levels. The switching frequency control policy can be varied to meet a wide range of objectives, including but not limited to the CEC or international efficiency weighting.

DETAILED DESCRIPTION

Overview

Varying the switching frequency of the modulator carrier wave in a pulse-width modulation (PWM) inverter in response to power flow from a photovoltaic (PV) system can be advantageous in one of two ways:

1. If high efficiency is the most desired, decreasing the switching frequency when the DC power is low increases overall efficiency because less power is lost to switching. If low waveform distortion is most desired, on the other hand, increasing the switching frequency when the DC power is low can reduce distortion by increasing the sampling frequency to remove noise.
2. In addition, variable carrier switching frequency allows optimization of the line reactor size while meeting power-quality standards. The switching frequency here is controlled by "policies" (firmware or software, functions or lookup tables) that assign a corresponding switching frequency command to be continuously variable power being passed by the inverter system.

The switching frequency of the inverter's PWM carrier wave is varied in response to the power passed by the system. The switching frequency is decreased resulting in an increase in inverter efficiency as long as the applicable total harmonic distortion (THD) requirements are met. Conversely, the switching frequency can be increased when the waveform THD requirements are exceeded.

The change in switching frequency is accomplished by PWM control in response to the power passed by the inverter system. This permits a decrease in switching frequency in conditions permitting decrease, provided that the switching frequency does not result in exceeding an allowed waveform distortion. If the output of the inverter would exceed allowed waveform distortion, the switching frequency is increased to prevent the waveform distortion from exceeding allowed distortion. This can be done automatically via "policies" (functions or lookup tables in the inverter firmware or software) that issue switching frequency commands. The switching frequency commands are typically based on power passed by the system. Variable carrier switching frequency also allows optimization of the line reactor size while meeting power-quality standards.

While PWM switching is described, this is presented by way of example, and any suitable inverter switching technique may be used.

Distributed Power Generating Station

Figure 1:
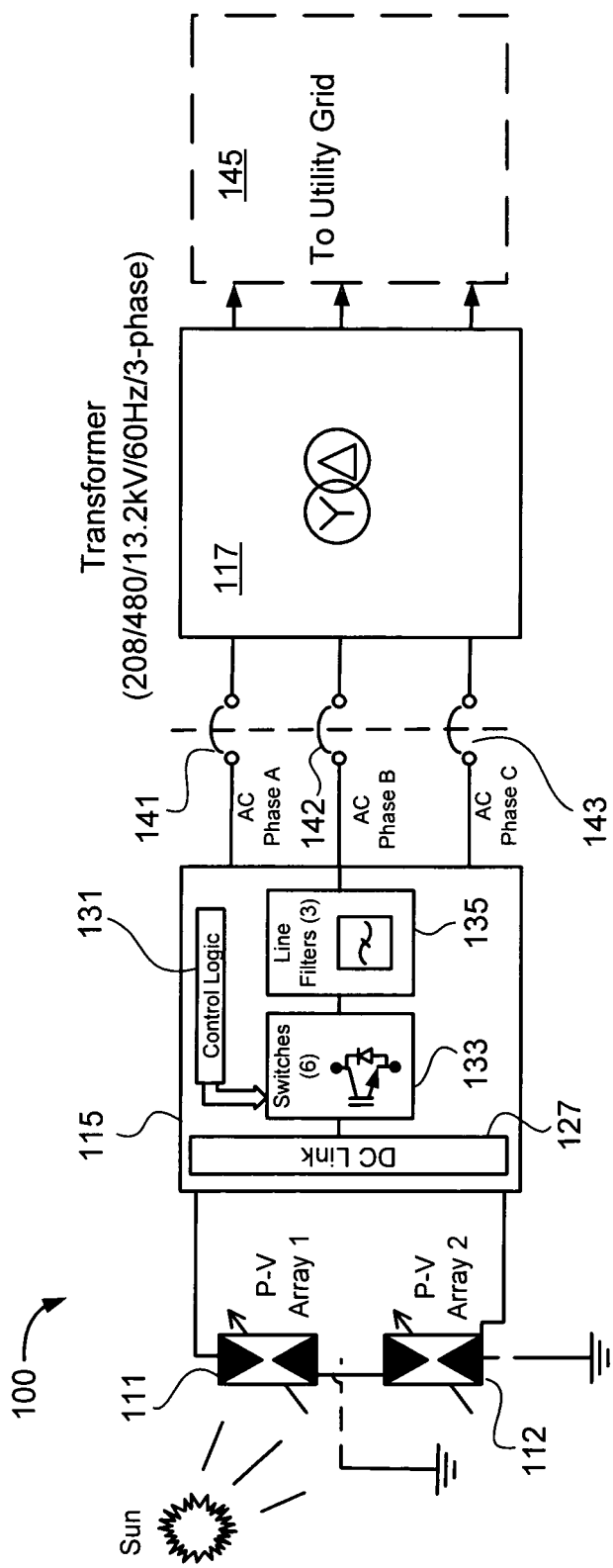
FIG. 1 is a conceptual diagram of a grid-tied distributed generation system utilizing PV as the energy source

FIG. 1 is a conceptual diagram of a grid-connected or "grid-tied" PV power generation system 100. Depicted are multiple photovoltaic (PV) array modules 111, 112, inverter 115, and three phase transformer 117. Each power station can include one or more PV array modules, which can be connected in any convenient manner (series, parallel, grounded, ungrounded, etc.) Inverter 115 includes a DC link, control logic 131, inverter switches 133 and output line filter 135. DC link 127 receives power from arrays 111, 112 and provides the power to inverter switches 133. The control logic 131 controls the operation of inverter switches 133, which is used to control the output current. The output from switches 133 is provided to line filters 135, and output through circuit protection 141-143 to output transformer 117, and in turn to the utility distribution or transmission grid 145.

Light from the sun is converted to DC power by PV array modules 111, 112. Inverter 115 converts the DC power to 3-phase AC power, and transformer 117 converts the AC power to the required grid voltage for connection to the utility grid 145. Arrays 111, 112 may be ungrounded, or connected to ground in a monopolar or bipolar configuration. Switches 133 convert DC to sinusoidal weighted PWM AC by switching the polarity of the input DC power. This is accomplished by use of PWM modulator. The sinusoidal weighted PWM 3-phase AC power is then fed through line reactors (one reactor per phase) either to a transformer or to a transformer-less interface for distribution. The line reactors remove high frequency components from the PWM waveform. Circuit breakers 141-143 provide overcurrent protection and a convenient maintenance disconnect. As described, this system can also be used with transformerless, ungrounded PV power systems.

In the inverter, DC power comes in through a DC link and is converted to AC by an array of switches. The switches are driven by control logic that includes a reference sine wave and a carrier wave. The carrier wave may be triangular, or sawtooth. The switches activate whenever the carrier wave "crosses over" the reference sine wave. The resulting "sine-like" AC wave is passed through a line filter to remove excess distortion.

The "sine-like" AC wave is achieved in part by adjustment in PWM control in response to an allowed waveform distortion. If a greater amount of distortion is permitted, this permits a decrease in switching frequency. The AC wave output from the inverter is allowed to distort as a result in the decrease in switching frequency to an extent that the switching frequency does not result in exceeding an allowed THD level. If the output of the inverter would exceed allowed THD levels the switching frequency is increased to prevent the waveform distortion from exceeding allowed distortion. The aforementioned "policies" are rendered in the form of functions or lookup tables in the inverter firmware or software. The functions or tables are used to issue switching frequency commands based on the DC power passed by the inverter system.

In general, a parameter is sensed and control of switching frequency of the inverter and varying the switching frequency is made in response to that parameter. In the example configuration, DC power is used as a parameter, so that control of switching frequency of the inverter and varying the switching frequency is made in response to DC power. It is possible to include alternative parameters instead of or in addition to DC power. One example of an alternative parameter is temperature, which could include temperature of the inverter, sensed ambient temperature and/or sensed temperature of the PV panel.

Inverter Configuration

Figure 2:
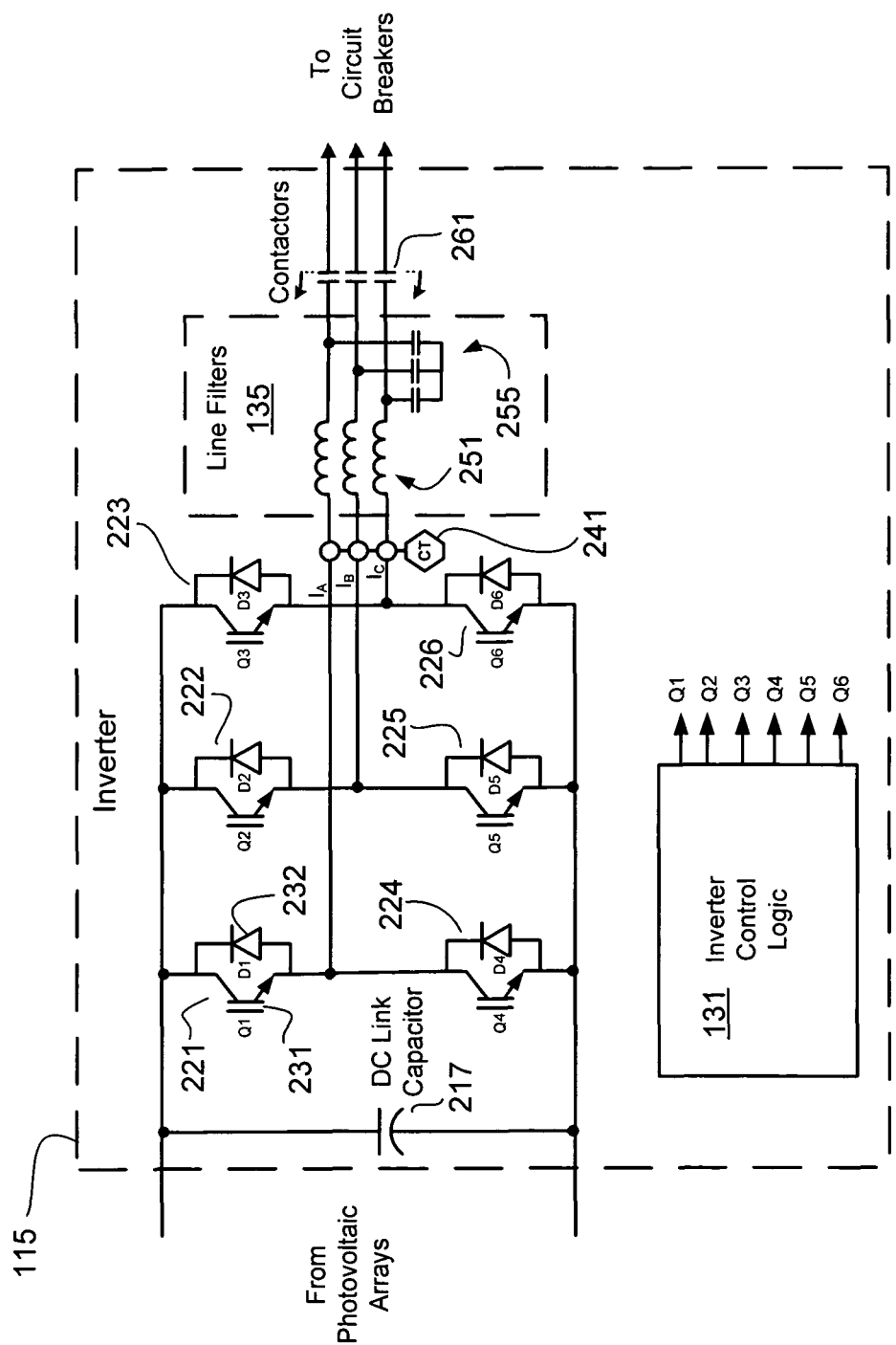
FIG. 2 is a schematic block diagram showing details of an example inverter.

FIG. 2 is a schematic block diagram showing details of inverter 115. DC link 127 (FIG. 1) includes DC link capacitor 217, which provides smoothing of input current. Inverter switches 221, 222, 223, 224, 225 and 226 provide a three phase PWM output. Each switch includes a switching transistor 231 and a diode 232. The current and voltage from the three phase output from switches 221-226 is sensed at sensors 241 and provided to line filters 135. Line filter 135 includes LC elements 251 and 255. Also included are switchgear 261 which may be integrated with circuit breakers 141-143.

Figure 3:
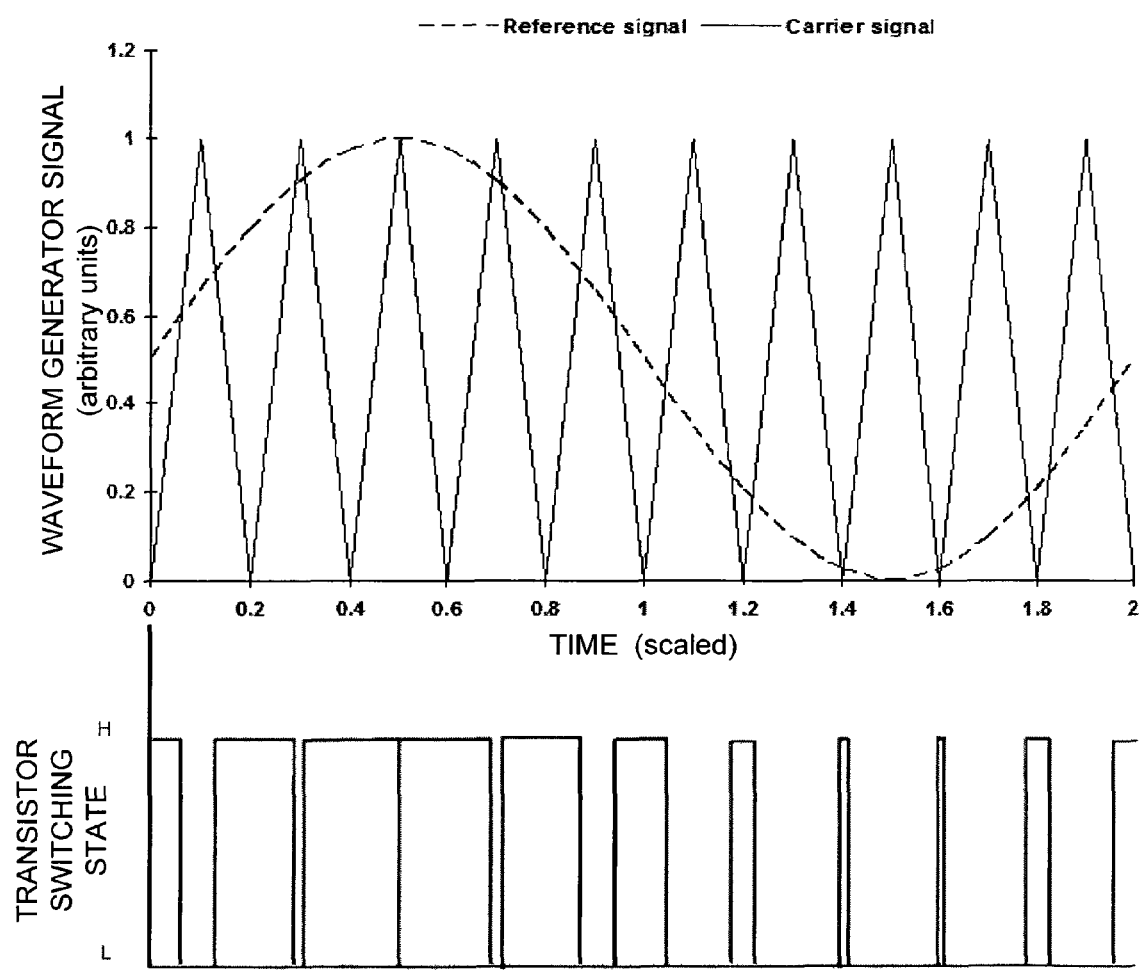
FIG. 3 is a graphical depiction of a sine wave reference and fixed frequency carrier with resulting PWM switching function.

FIG. 3 is a graphical depiction of one cycle of a sine wave reference and a constant frequency triangular carrier waveform. The bottom portion of the FIG. 3 shows the switching signal which goes off to an upper transistor in one of the three phases. The lower transistors see a switching signal which is the logical inverse of the upper transistor switch. These transistor switching signals provide an inverter PWM output which is weighted according to the reference sine wave. The depiction shows how the PWM signal is generated by the modulator. The sine wave reference is a fixed utility frequency, and serves as a reference signal. The reference signal is modulated by a triangle wave, the carrier signal, which has much higher frequency than the reference signal (typically several kHz). Every time the carrier triangle waveform crosses the reference sine waveform, the modulator signal toggles between a high and a low state. This produces a train of pulses with a periodically varying duty cycle.

The depiction of a triangle wave is given by way of non-limiting example. It is alternatively possible to achieve modulation of the inverter output by other techniques, including space vector control, hysteresis control, delta-modulation, natural sampling or other PWM techniques or algorithms.

Figure 4:
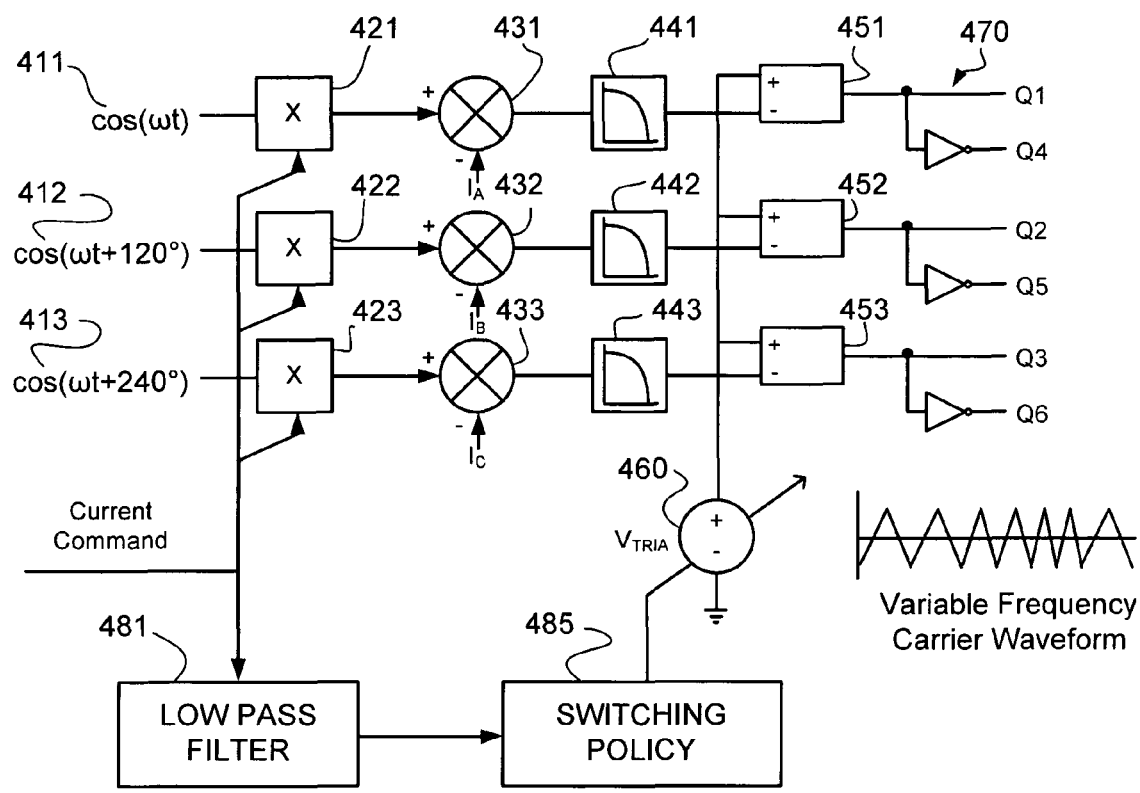
FIG. 4 is a schematic block diagram showing details of an example inverter control logic circuit.

FIG. 4 is a schematic block diagram showing details of an example inverter control logic circuit. Normalized sinusoidal reference waveforms 411, 412 and 413 are input to multipliers 421, 422, 423. The process of multiplying the normalized waveforms by a current level command creates reference AC current commands on the output of the multipliers. These signals represent the current level that the inverter is instructed to produce. The reference AC waveforms are summed with the actual currents at summing junctions 431, 432, 433. The outputs of the summing junctions represent the error signal, which is the difference between the AC current reference signals and the actual currents. These signals are process by compensators 441, 442, 443. Triangular waveform generator 460 provides a reference triangular waveform, which is provided to comparators 451, 452, 453. The outputs of the compensators represent the voltage necessary to cause the actual current to follow the reference current. These voltage waveforms are then intercepted by the high frequency triangular carrier waveform to produce the PWM switching signals by comparison at the comparators 451 452, 453. This provides direct and inverted outputs at 470, to inverter switches 231.

Multipliers 421-423 provide current command outputs to low pass filter module 481, which in turn provides a corresponding filtered current command output to switching policy module 485. Switching policy module 485 provides a control signal to triangular waveform generator 460. The switching policy module 485 provides a programmable adjustment capable of controlling efficiencies within limits imposed by the allowed waveform distortion and within predetermined distortion limits.

Power Dependence of Efficiency and THD

The inverter system presents some opportunities to increase efficiency. In particular, some inverter losses depend on switching frequency (which in turn depends on the carrier-wave frequency). The transitional loss in the switches, due to the momentary power drop across them while they transition between "on" and "off," is:

$$P_{sw} = (E_{son} + E_{soff})f_{sw}\frac{1}{2\pi}\int_0^T \sin\omega t\, dt \qquad \text{(equation 1a)}$$

which reduces to $$P_{sw} = \frac{f_{sw}}{\pi}(E_{son} + E_{soff}) \qquad \text{(equation 1b)}$$

where $P_{sw}$=switching loss in watts,
φ is the utility radian frequency,
$E_{son}$=switching energy during "off-on" transition,
$E_{soff}$=switching energy during "on-off" transition, and
$f_{sw}$=switching frequency.
$E_{son}$ and $E_{soff}$ are not constant, but are linearly proportional to the switch's collector current. Meanwhile, each of the diodes connected to the switches incurs a reverse-recovery loss whenever the corresponding switch turns from on to off, $$P_{rr} = V_{dc}E_{rec}f_{sw} \qquad \text{(equation 2)}$$

where $P_{rr}$=reverse recovery loss in watts,
$E_{rec}$=switching energy in the rectifier, and
$V_{dc}$=DC Bus Voltage.

Given these proportionalities, decreasing the switching frequency would increase inverter efficiency by reducing these sources of loss. However, this switching frequency is the frequency at which the reference sine wave is sampled; higher switching frequency provides more samples and lower THD levels. Regulations often express these limits in terms of a maximum acceptable total harmonic distortion (THD):

$$THD = \frac{\text{Power in all harmonic components}}{\text{Power in the fundamental frequency component}} \qquad \text{(equation 3)}$$

Figure 5:
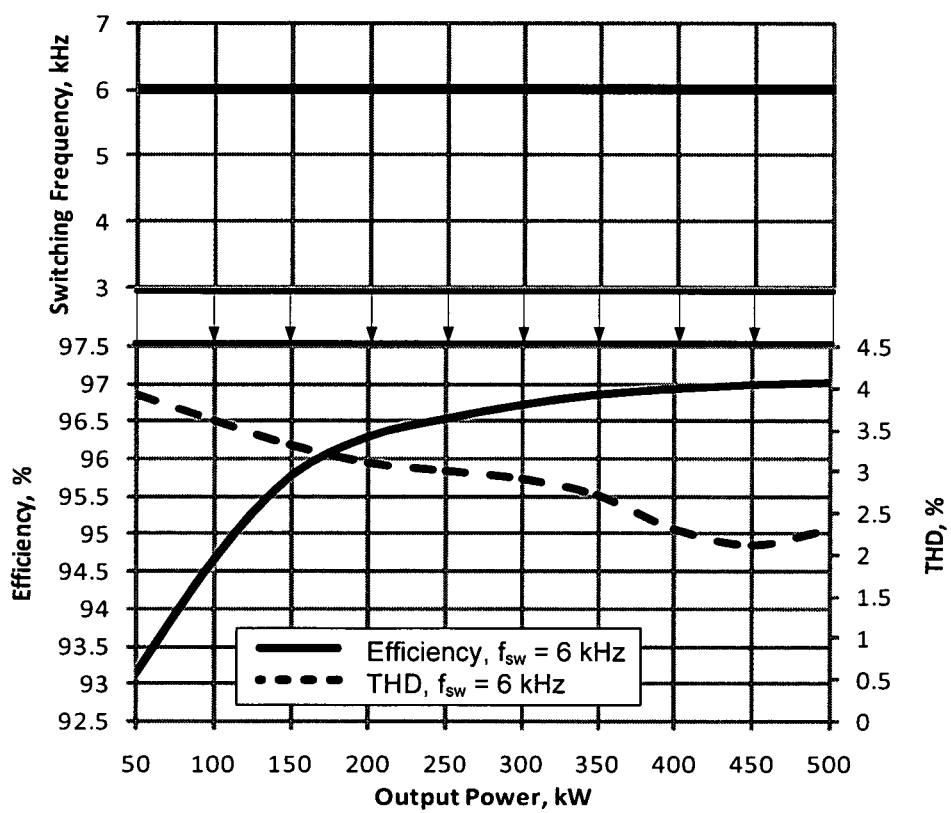
FIG. 5 is a graph showing inverter efficiency and THD utilizing a constant switching frequency

Therefore, since inverter switching frequency affects both efficiency (slower is better) and THD (slower is worse), both variables must be scrutinized when choosing a switching frequency. FIG. 5 is a graph depicting modeled power dependence of efficiency and THD for the constant switching frequency. Constant switching frequency is typical of the prior art.

The top half of the chart shows the constant switching frequency, which in the example is 6 kHz, appearing as a straight line at the top of the graph. The result is that efficiency increases according to the curve depicted as a solid (curved) line at the bottom half of the graph. THD, depicted by the dashed line, starts out high, but decreases as power increases. At the center of the graph, for example between 200 and 400 kW, the efficiency is below 97%.

The described techniques effect control of the carrier frequency via a variable current command that responds to the inverter power. One embodiment derives the current command from the maximum power-point tracking (MPPT) output, but other embodiments may use other means to sense the array power or the irradiance on the array.

The control may be achieved by compensators 441, 442, 443 (FIG. 4), providing programmable adjustment. This controls efficiency within allowed waveform distortion parameters according to a predetermined weighted efficiency related to efficiency incentives related to percentages of power rating.

Figure 6:
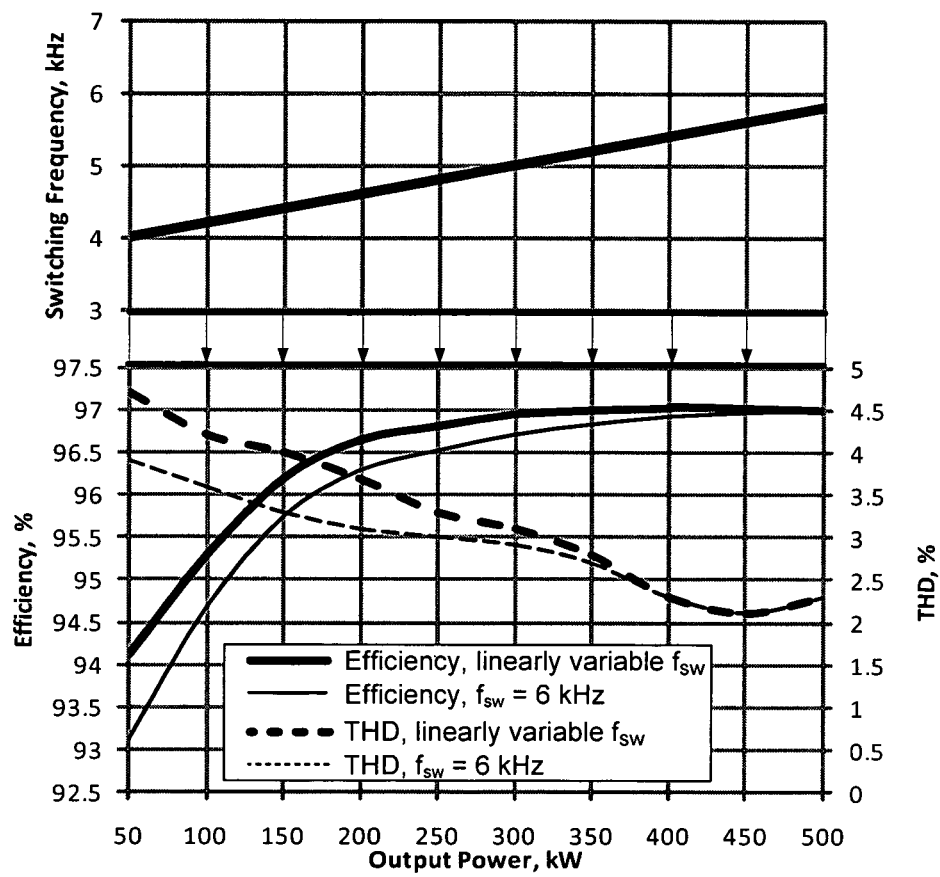
FIG. 6 is a graph showing inverter efficiency and THD for a linearly varying switching frequency.
Figure 7:
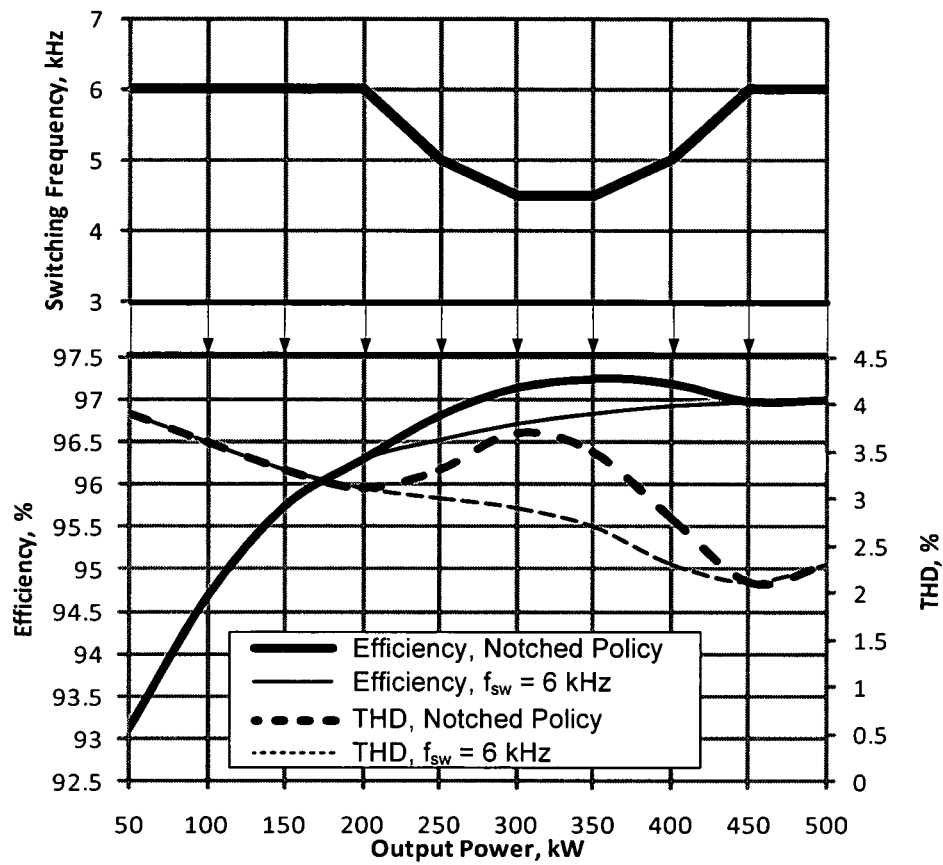
FIG. 7 is a graph showing efficiency and THD for a notched switching frequency variation based on CEC efficiency weighting, and comparison to constant switching frequency

FIGS. 6 and 7 are graphs showing efficiency and THD in accordance with switching frequency policies defined by the top portions of the respective graphs. FIG. 6 is a graph showing efficiency and THD with linear switching frequency variation as a function of load current. The constant switching frequency comparison is also provided on the figure.

The top half of the chart shows an increase in switching frequency corresponding to power. As depicted, at 50 kW, the switching frequency is 4 kHz, which increases to 6 kHz as power increases. The lower portion of the graph depicts efficiency and THD resulting from the variable switching frequency as the heavier lines. The efficiency and THD resulting from the constant switching frequency of FIG. 5 are superimposed on this graph, in lighter lines. The graph shows the modeled results, in which the efficiency is higher in the middle range, for example between 200 and 400 kW, when using the variable switching frequency. The efficiency is still below or near 97%, but slightly higher than obtained with the 6 kHz switching frequency.

This presents a very simple linear policy that sets the carrier frequency to its nominal design value of 6 kHz when the array delivers maximum power, and decreases it linearly to 4 kHz as power decreases. Compared to using 6 kHz for all power levels, the linear algorithm produces a noticeable increase in efficiency at low power. The THD also increases at low power with the linear algorithm, but this is permissible as long as it does not exceed the permissible THD limits.

FIG. 7 is a graph showing efficiency and THD with notched switching frequency variation, and comparison to constant switching frequency. This notched switching frequency would be used to maximize efficiency at the levels determined by weighted efficiency standards such as the CEC or international standards. This shows the modeled results of the notched policy, where the switching frequency is varied with power according to a notched curve to peak the efficiency at 75% of maximum power.

The notched region is depicted as minimizing switching frequency between 300 and 350 kW, where switching frequency drops to 4500 kHz. This causes THD to increase at that range, but also results in efficiencies above 97%. The increase in distortion is not affected at low power levels, as a result of the 6 kHz switching frequency. Similarly, the distortion is not affected at high power levels, also as a result of the 6 kHz switching frequency. As a result, in the notch region, the efficiency is maximized while not resulting in changes in THD at the low and high power ranges of power. If the efficiency rating of the inverter includes a substantial component of measurements taken at the middle power levels (between 200 and 400 kW in this example), the rated efficiency will increase.

This adjustment of efficiency allows the inverter to operate in a manner which increases its rated efficiency. Since the rated efficiency is designed to anticipate optimum performance of the equipment under a variety of conditions, this also results in a more optimum overall performance of the distributed power system.

One possible algorithm, for situations where efficiency is critical, boosts efficiency at low array powers by decreasing the carrier-switching frequency accordingly, but does not decrease it so much that the waveform quality fails to meet applicable regulatory standards. By way of non-limiting example, a nominal 6 kHz system might be decreased to 3 kHz and still meet the standards, but a further decrease would risk THD non-compliance.

As an alternative, it is possible to increase switching frequency when the array power decreases. This alternative is advantageous in cases in which waveform quality or small line-reactor size is more important than efficiency. Another possible policy, when low THD or small line-reactor size is more important than efficiency, would increase switching frequency when the array power decreases.

CONCLUSION

Advantages of this type of control include the fact that this provides an inverter that changes switching frequency in response to a drop in array power. The switching can be decreased for more efficiency or increased for lower distortion. The switching can be performed with or without MPPT input. This switching is suitable for ungrounded, monopolar-grounded, or bipolar-grounded arrays.

It will be understood that many additional changes in the details, materials, steps and arrangement of parts, which have been herein described and illustrated to explain the nature of the invention, may be made by those skilled in the art within the principle and scope of the invention as expressed in the appended claims.

The invention claimed is:

1. An inverter control circuit, comprising:
    a logic unit receiving a sensed parameter, applying a switching-frequency policy based in part on the sensed parameter, and issuing a switching-frequency command, and
    a switch controller configured to vary or set the switching frequency based on the switching-frequency command, where
    the switching-frequency policy predicts an inverter efficiency and a waveform distortion corresponding to pairs of values of the sensed parameter and the switching frequency, and
    the logic unit uses the switching-frequency policy to choose a switching frequency that optimizes efficiency or AC output power while constraining the predicted waveform distortion below a predetermined level; and
    wherein the sensed parameter is a parameter of a DC power source delivering power to an inverter, or of the environment around the inverter or at the DC power source.

2. The inverter control circuit of claim 1, where
    the inverter synthesizes an output waveform by pulse-width modulation, and
    the switch controller varies or sets the switching frequency at least in part by varying or setting the frequency of a pulse-width-modulation carrier wave.

3. The inverter control circuit of claim 1, where the logic unit responds to changes in temperature of a photovoltaic panel or the ambient surroundings.

4. The inverter control circuit of claim 1, configured to operate with at least one of bipolar-grounded, a monopolar-grounded, and an ungrounded power station.

5. The inverter control circuit of claim 1, where the commands comprise
    setting the inverter switching frequency to a default value corresponding to high AC power output while the sensed parameter and a standard differ by less than a threshold, and
    if the threshold is exceeded, adjusting the inverter switching frequency until the threshold is no longer exceeded.

6. The inverter control circuit of claim 5, where
    the sensed parameter comprises an AC waveform output by the inverter,
    the standard comprises an ideal AC waveform,
    the result of comparing the sensed parameter to the standard is an error signal representing waveform distortion, and
    the threshold represents a maximum waveform distortion permitted in the AC power output of the inverter.

7. The inverter control circuit of claim 6, where the threshold is programmable to correspond to a predetermined total-harmonic-distortion limit.

8. The inverter control circuit of claim 6, where
    the inverter output is routed through a line reactor for waveform smoothing, and
    the line reactor size is optimized with respect to waveform quality and output power by the switching-frequency policy.

9. The inverter control circuit of claim 5, where the logic unit responds to changes in a measurement signal, where the measurement signal comprises DC input power to the inverter, AC output power from the inverter, or a variable related to the DC input power or the AC output power.

10. The inverter control circuit of claim 9, where the logic unit uses a policy to evaluate the sensed parameter and the measurement signal and formulate the commands for the switch controller.

11. The inverter control circuit of claim 10, where
    the sensed parameter comprises an AC waveform output by the inverter, the standard comprises an ideal AC waveform,
    the result of comparing the sensed parameter to the standard is an error signal representing waveform distortion,
    the threshold represents a maximum waveform distortion permitted in the AC power output of the inverter,
    the measurement signal is related to the AC power output by the inverter, and
    the policy instructs the logic unit to decrease the switching frequency while the waveform distortion is less than the threshold, to increase the switching frequency if the waveform reaches or exceeds the threshold, and to stop increasing the switching frequency when the waveform distortion falls below the threshold.

12. The inverter control circuit of claim 11, where the policy comprises a variable weighting factor representing a balance of inverter efficiency and waveform distortion associated with a given switching frequency and a given value of the sensed parameter.

13. The inverter control circuit of claim 12, where the variable weighting factor depends on a percentage of a power rating at which the inverter is operating.

14. The inverter control circuit of claim 13, where the variable weighting factor creates a local minimum of switching frequency at the percentage of the power rating where an established efficiency-based incentive exists.

* * * * *